United States Patent Office 3,334,128
Patented Aug. 1, 1967

3,334,128
PROCESS FOR PREPARATION OF BIS(CHLOROFORMATES) FROM DIOLS
Morton Brown, Wilmington, Del., assignor to E. I. du Pont de Nemours and Company, Wilmington, Del., a corporation of Delaware
No Drawing. Filed Aug. 21, 1964, Ser. No. 391,318
6 Claims. (Cl. 260—463)

This invention relates to a process for the preparation of bis(chloroformates) of diols and more particularly to an improved process for the preparation of bis(chloroformates) from diols which can form cyclic carbonate esters.

In the preparation of certain polyurethane polymers, such as are disclosed in U.S. Patent 2,929,802, phosgene is reacted with a dihydroxy compound to convert it to a bis(chloroformate). The bis(chloroformate) is then reacted with a diamine to produce a polyurethane polymer. Products having differing properties may be prepared by varying the nature and proportions of the various reactants used in preparing the polymers. For certain products, it is desired to use a low-molecular-weight dihydroxy component. A serious problem arises when the dihydroxy compound is of such a nature that it can react with phosgene to yield a cyclic carbonate having 5 or 6 members in the ring. The presence of these cyclic carbonates in the reaction mixture is detrimental to the quality of the final polymer because they appear to react to terminate the growing polymer chains. Consequently, the final polymers will have undesirably low average molecular weights as indicated by low inherent viscosities.

Various methods have been tried to alleviate this problem. For example, U.S. Patent 2,873,291 describes a method for preparing bis(chloroformates) of 1,2-diols wherein the formation of cyclic carbonates is minimized by the presence in the reaction mass of a tertiary amine. This method is impractical in certain reaction systems because of the insolubility of the amine hydrochlorides formed. Also some of the tertiary amines are insoluble in water and are difficult to remove from the bis(chloroformates). The presence of the tertiary amine is undesirable in the final polymer. U.S. Patent 2,787,630 discloses a process wherein bis(chloroformates) are prepared from certain diols by reacting them with phosgene in an ether solvent. The patent states that, to obtain a more nearly quantitative yield, it is preferred to permit the reactants to stand from 6 to 10 hours. Such long hold times are uneconomical.

The problem of accelerating the reaction is complicated by the high reactivity of the phosgene being used as a reactant. Any added material must be one which is unaffected by the reagents; particularly it must be one which does not react irreversibly with phosgene. Also, it must be one whose presence does not impair the quality of the final product or which can be readily removed from the reaction mass before polymer preparation.

It is an object of the present invention to provide an improved process for the preparation of bis(chloroformates) of certain diols. A further object is to provide an improved process for the preparation of these bis(chloroformates) wherein the formation of cyclic carbonate esters is kept to a minimum. Other objects will appear hereinafter.

These and other objects of the present invention are accomplished by reacting a diol which is capable of forming a cyclic carbonate ester with a stoichiometric excess of phosgene in an ether solvent with the reaction being carried out in the presence of a tetraalkylurea compound. More particularly, the present invention provides a process for the preparation of a bis(chloroformate) of a diol, said diol having the formula HO—CHR—(CR$_2$)$_n$—CHR—OH wherein $n$ is 0 or 1 and the R's are independently selected from the group consisting of hydrogen and lower alkyl radicals, in which process said diol is reacted with a stoichiometric excess of phosgene in an ether solvent, with said reaction being carried out in the presence of at least 0.005 mole, per mole of said diol, of a tetraalkylurea having the formula

NX$_2$—CO—NX$_2$ wherein the X's are lower alkyl radicals.

The diols which are employed in the process of the present invention have the formula HO—CHR—(CR$_2$)$_n$—CHR—OH wherein $n$ and R are as defined above. These diols are capable of reacting with phosgene to form cyclic carbonate esters having 5 or 6 atoms in the ring. When the diol is ethylene glycol this cyclic carbonate ester formation may be illustrated as follows:

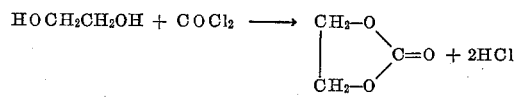

The diols are those wherein the various R substituents may be either hydrogen or lower alkyl radicals containing up to about 4 carbon atoms. Examples of suitable compounds include ethylene glycol, 1,3-propanediol, 1,2-propanediol, 2,2-dimethyl-1,3-propanediol, 2,2-diethyl-1,3-propanediol, 2,2-dibutyl-1,3-propanediol, 2-ethyl-1,3-propanediol, 2-ethyl-2-isopropyl-1,3-propanediol, 2-ethyl-2-methyl - 1,3 - propanediol, 2-butyl-2-methyl-1,3-propanediol, 2-butyl-2-ethyl-1,3-propanediol, 2-butyl-1,3-propanediol, 2-sec-butyl-1,3-propanediol, 1,2-butanediol, 1,3-butanediol, 2-butyl-1,3-butanediol, 2-ethyl-1,3-butanediol, 2-isobutyl-1,3-butanediol, 2-isopropyl-1,3-butanediol, 2-methyl-1,3-butanediol, 2-propyl-1,3-butanediol, 2,3-butanediol, 1,3-pentanediol, 2,2-dimethyl-1,3-pentanediol, 2-ethyl-1,3-pentanediol, 2-methyl-1,3-pentanediol, 2,4-pentanediol, 2-ethyl-2,4-pentanediol, 3-methyl-2,4-pentanediol, 1,3-hexanediol, 2-ethyl-1,3-hexanediol, 2-methyl-1,3-hexanediol, 4-methyl - 1,3 - hexanediol, 2,3-hexanediol, 2,4-hexanediol, 3-ethyl-2,4-hexanediol, 3-methyl-2,4- hexanediol, 2,4-heptanediol, 3,4-heptanediol, 3,5-heptanediol, 2,4-octanediol, 3-ethyl-2,4-octanediol, 3,4-octanediol, 3,5-octanediol, 4-ethyl-3,5-octanediol, 7-methyl-3,5-octanediol, 2,4,4-trimethyl-3,5-octanediol, 4,5-octanediol and 4,6-nonanediol.

The tetraalkylurea compounds which are employed in the process of the present invention have the formula

NX$_2$—CO—NX$_2$ wherein the X's are lower alkyl radicals having up to about 4 carbon atoms with the understanding that these X's need not all be the same. Tetramethylurea is preferred because of its ready availability. Examples of other suitable compounds are tetraethylurea, tetrabutylurea, 1,1 - diethyl-3,3-dipropylurea, 1,1 - diethyl-3,3-dimethylurea, and 1,1,3-triethyl-3-methylurea. These tetraalkylureas have sufficient water solubility that they may be used out of the final polymer for which the bis(chloroformate) is an intermediate.

In order for the tetraalkylurea to be effective in reducing the amount of cyclic carbonate ester formation, it is essential that the reaction between the diol and phosgene be carried out in the presence of an ether solvent. The ether should either be inert to phosgene or may itself contain two hydroxy groups so that it will be converted into a bis(chloroformate). Thus the solvent may be a dialkyl ether, a cyclic ether, a polyalkyl ether of a polyhydroxy compound, or a polyalkylene ether glycol. Examples include ethyl ether, ethyl propyl ether, diisopropyl ether, the diethyl ether of ethylene glycol, the dimethyl ether of diethylene glycol, dioxane and tetrahydropyran. Suitable hydroxy-containing ethers are polyalkylene glycols ranging from the simple oxydialkanols to polyalkylene ether glycols having molecular weights of several thousand. Representative types of polyalkyleneether glycols are polyethylene glycols, polypropylene glycols, polytrimethyleneether glycols, and polytetramethyleneether glycols. The presence of the tetraalkylurea has no significant effect on the reaction of the diol with phosgene unless the diol is capable of forming a cyclic carbonate ester having 5 or 6 atoms in the ring.

At least 0.005 mole of tetraalkylurea per mole of the diol reactant should be present in the reaction system. Smaller amounts than this may require longer reaction times or excessive amounts of phosgene in order to obtain bis(chloroformates) of sufficiently low content of cyclic carbonate ester. There is usually no advantage in using more than 0.06 mole of tetraalkylurea per mole of diol.

The amount of phosgene used in the reaction should be at least a 25% stoichiometric excess. The stoichiometric amount of phosgene is at least 2 moles for every mole of diol or, stated in another way, one mole of phosgene per half mole (equivalent) of diol compound. If the ether solvent is also a dihydroxy compound, this must be included in calculating the required amount of phosgene. While as little as 1.1 mole of phosgene per half mole (equivalent) of hydroxy compound may sometimes be used, particularly with the higher proportions of tetraalkylurea, it usually requires a longer reaction time and higher proportions of phosgene to produce the desired results. There is no limit on the maximum amount of phosgene which is to be used; however, for practical reasons, no more than about 5 moles per half mole of hydroxy compound should be employed.

The amount of ether solvent is not critical. At least one part by weight of solvent per part of diol reactant should suffice, although more may be used if desired.

The preparation of the bis(chloroformates) according to the present invention may be carried out using conventional techniques. The diol may be dissolved in the ether solvent or the solvent may be introduced into the reaction vessel before the addition of the diol. One method is to add the diol to the entire amount of phosgene. The process may be carried out on a continuous basis, for example, in a pipe-line reactor or in a series of reactors. It is preferable to have an excess of phosgene present at all times in order to minimize the formation of cyclic carbonates.

Temperatures of about 0° C. to about 50° C. may be used. It is convenient to carry out the reaction under reflux conditions. Atmospheric pressures are most convenient, although higher or lower pressures may be used if desired. Usually two hours is a sufficient time for the production of bis(chloroformates) containing a sufficiently low amount of cyclic carbonates. In many cases even one hour may be all that is required. This short reaction time is a significant advantage in the present process.

It is preferred to remove the hydrogen chloride as it is formed from the reaction medium. This may be done by conventional methods, such as by sweeping with a slow stream of an inert gas. At the end of the reaction the excess phosgene is removed using conventional techniques.

The tetraalkylurea may be washed out of the bis(chloroformates) with water, if desired, or it may remain in the product during subsequent reactions. In the formation of polyurethanes, the tetraalkylurea need not be removed until after the polyurethane has been formed.

Because of technical difficulties involved in accurate determinations of small amounts of cyclic carbonates in the bis(chloroformates) produced, the most convenient way of evaluating the bis(chloroformates) is to convert them to linear polyurethanes and measure the inherent viscosities of these polymers. The cyclic carbonates react as monofunctional compounds with amines and therefore terminate the polymer chains and lower the molecular weight of the polymer.

The bis(chloroformates) prepared by the present invention are highly useful for the preparation of linear polyurethanes such as those described in U.S. Patent 2,929,802.

The following examples will better illustrate the nature of the present invention; however, the invention is not intended to be limited to these examples. Parts are by weight unless otherwise indicated.

*Example 1*

A. A mixture is prepared containing polytetramethyleneether glycol having an average molecular weight of about 1000 (hereafter for convenience called PTMEG) and neopentyl glycol (2,2-dimethyl-1,3-propanediol) in a molar ratio of one mole of PTMEG to 2 moles of neopentyl glycol. 1208 grams of this mixture will theoretically require 594 g. (6 moles) of phosgene to react with all the hydroxy groups present. In each experiment 120.8 g. of the mixture, containing additionally an amount of tetramethylurea (TMU), as shown in Table I, is added dropwise over a period of one hour to a body of liquid phosgene contained in a four-neck flask. The amount of phosgene employed in each run is shown in Table I. The flask is connected to a reflux condenser cooled with acetone which has been circulated through a "Dry Ice"-acetone mixture. The flask is provided with a stirrer, dropping funnel, thermometer and a means for sweeping nitrogen through the reaction mixture. Agitation is maintained in the flask during the reaction.

After addition of the glycols to the phosgene is complete, the mixture is held under reflux at a temperature of about 5 to 35° C. for two hours. During the reaction the evolved hydrogen chloride is swept out of the reaction mixture by a slow stream of nitrogen. At the end of the hold period, the excess phosgene is removed from the reaction mixture by passing it down through a glass column heated to 65° C. and filled with ¼-inch glass spirals. A nitrogen stream flowing countercurrent to the chloroformate stream carries off the hydrogen chloride and phosgene. The column is under pressure of about 20 mm. Hg.

In these experiments the PTMEG serves as an ether solvent for the reaction of the neopentyl glycol with phosgene and also is itself converted to a bis(chloroformate).

To evaluate the content of cyclic carbonates in the bis(chloroformates), they are converted to polyurethane polymers. Since the inherent viscosity of the final polymer is significantly reduced by the presence of the bis(chloroformate) of cyclic carbonate ester of neopentyl glycol, the inherent viscosity of the polymer formed is taken as an indication of the effectiveness of the tetramethylurea in decreasing the content of the cyclic carbonate in the bis(chloroformate).

B. Polymers are prepared as follows: In a Waring blendor is placed 15.83 g. of the bis(chloroformate) mixture [0.01 mole of the bis(chloroformate) of PTMEG and 0.02 mole of the bis(chloroformate) of neopentyl glycol], 1.83 g. (0.01 mole) of adipyl chloride, and 200 ml. of methylene chloride. To the rapidly stirred solution is added 3.61 g. of piperazine (as a 1.648 M aqueous solution). There is then added immediately 80 ml. of a 1 M solution of sodium carbonate. The emulsion formed is stirred ten minutes with periodic addition of methylene chloride to maintain the liquid level. The polymer is isolated by adding the emulsion to one liter of hot distilled water (about 70° C.) to drive off the solvent. The polymer is removed by filtration and dried at 100° C. for 24 hrs.

Inherent viscosity of the polymer is measured at 30° C. using a solution of 0.1 g. of polymer in 100 ml. of m-cresol.

Table I shows the pertinent data for each run and the inherent viscosity of the final polymer.

TABLE I

| Run No. | Phosgene Moles/ equivalent of diol [1] | TMU Moles/mole of Neopentyl glycol | Inherent Viscosity of Polymer |
|---|---|---|---|
| A | 3.33 | 0.060 | 2.68 |
| B | 1.5 | 0.005 | 2.63 |
| C | 1.25 | 0.005 | 2.76 |
| D | 3.33 | 0 | 0.86 |
| E | 1.5 | 0 | 0.95 |

[1] Neopentyl glycol plus PTMEG.

From Table I it can be seen that polymers having significantly higher inherent viscosities are produced when the bis(chloroformates) are prepared in the presence of tetramethylurea as compared with those prepared without tetramethylurea. Note that a reaction time of only two hours is used. Essentially similar results may be obtained when an equivalent molar amount of tetrabutylurea is used in place of tetramethylurea.

When Run E of Table I is continued for 6 hours, the polymer prepared from the bis(chloroformate) has an inherent viscosity of only 1.94.

Example 2

This experiment is carried out in the same manner as Example 1 except that the mixture of glycols contains 1 mole of PTMEG of 1000 molecular weight and 2 moles of trimethylene glycol. The phosgenation is carried out using 1.50 moles of phosgene per equivalent of hydroxy compound. Two runs are carried out as follows:

Run A—1.15 g. of tetramethylurea is added to the glycol mixture (0.05 mole per mole of trimethylene glycol).
Run B—Control. No tetramethylurea is present.

The inherent viscosities of the final polymers are:

Run A 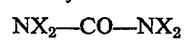 2.30
Run B _____ 1.81

Example 3

A. In this experiment ethylene glycol is converted to its bis(chloroformate). In each run 31 g. (0.5 mole) of ethylene glycol is reacted with phosgene. The glycol is added to liquid phosgene over a period of 0.5 hour. Two moles of phosgene per equivalent of ethylene glycol is used. Three separate runs are made as follows:

Run A—No solvent or tetramethylurea is used.
Run B—The phosgene is dissolved in 100 ml. of ethyl ether but no tetramethylurea is present.
Run C—The phosgene is dissolved in 100 ml. of ethyl ether and 0.31 g. of tetramethylurea is added (0.005 mole per mole of ethylene glycol).
Run D—No ether is used but 0.31 g. of tetramethylurea is added to the phosgene.

In every run the reaction mixture is stirred under reflux conditions for 2 hours after the addition of the ethylene glycol. The reaction mixture is freed of excess phosgene as described in Example 1.

B. Polymers are prepared as follows: To a solution of 11.25 g. (0.01 mole) of polytetramethyleneether glycol bis(chloroformate) and 5.61 g. (0.03 mole) of the ethylene glycol bis(chloroformate) prepared above in 200 ml. of methylene chloride is added 3.5 g. (0.0408 mole) of piperazine as an aqueous solution followed by 60 ml. of a 1 M aqueous solution of sodium carbonate. The polymer is isolated as described in Example 1.

Table II shows the inherent viscosities of the polymers prepared.

TABLE II

| Run | | Inherent Viscosity of polymer |
|---|---|---|
| A | No solvent or tetramethylurea | 1.07 |
| B | Ether solvent but no tetramethylurea | 1.85 |
| C | Ether solvent plus tetramethylurea | 2.39 |
| D | No solvent but with tetramethylurea | 1.37 |

From the above table it can be seen that when the bis(chloroformate) of the ethylene glycol is prepared in the presence of tetramethylurea and ether solvent, the final polymer shows a significant improvement in inherent viscosity.

Similar results may be obtained when the tetramethylurea is replaced by an equivalent molar amount of tetraethylurea.

As many widely different embodiments of this invention may be made without departing from the spirit and scope thereof, it is to be understood that this invention is not limited to the specific embodiments thereof except as defined in the appended claims.

What is claimed is:

1. In the process for the preparation of a bis(chloroformate) of a diol by reacting a stoichiometric excess of phosgene in an ether solvent with a diol having the formula $$HO—CHR—(CR_2)_n—CHR—OH$$

wherein $n$ is an integer from 0 to 1 and R is selected from the group consisting of hydrogen and lower alkyl radicals, the improvement comprising carrying out the reaction in the presence of at least 0.005 mole, per mole of said diol, of a tetraalkylurea having the formula $$NX_2—CO—NX_2$$

wherein X is a lower alkyl radical.

2. The process of claim 1 wherein the stoichiometric excess of phosgene employed is at least 1.25 mole per equivalent of diol compound reacted.

3. The process of claim 2 wherein the ether solvent is a polytetramethyleneether glycol.

4. The process of claim 1 wherein the tetraalkylurea is tetramethylurea.

5. In the process for the preparation of the bis(chloroformate) of neopentyl glycol by reacting phosgene with neopentyl glycol in a polytetramethyleneether glycol solvent, the amount of phosgene employed being at least 1.25 mole per equivalent of dihydroxy compound reacted, the improvement comprising carrying out the reaction in the presence of from about 0.005 mole to 0.06 mole, per mole of neopentyl glycol, of tetramethylurea.

6. In the process for the preparation of the bis(chloroformate) of ethylene glycol by reacting phosgene with ethylene glycol in an ether solvent, the amount of phosgene employed being at least 1.25 mole per equivalent of ethylene glycol, the improvement comprising carrying out the reaction in the presence of from 0.005 mole to 0.06 mole, per mole of ethylene glycol, of tetramethylurea.

References Cited

UNITED STATES PATENTS

| | | | |
|---|---|---|---|
| 2,787,630 | 4/1957 | Katz et al. | 260—463 |
| 3,170,946 | 2/1965 | Kilsheimer et al. | 260—463 |
| 3,211,774 | 10/1965 | Stephens | 260—463 |

CHARLES B. PARKER, *Primary Examiner.*

FLOYD D. HIGEL, *Examiner.*